US010438019B2

(12) United States Patent
Viswanathan et al.

(10) Patent No.: US 10,438,019 B2
(45) Date of Patent: Oct. 8, 2019

(54) CROSS CONTAINER USER MODEL

(71) Applicant: Microsoft Technology Licensing, LLC, Redmond, WA (US)

(72) Inventors: Giridhar Viswanathan, Redmond, WA (US); Gerardo Diaz Cuellar, Kirkland, WA (US); Hari R. Pulapaka, Redmond, WA (US); Ivan Dimitrov Pashov, Woodinville, WA (US); Navin Narayan Pai, Seattle, WA (US); Benjamin M. Schultz, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 161 days.

(21) Appl. No.: 15/640,164

(22) Filed: Jun. 30, 2017

(65) Prior Publication Data

US 2018/0322307 A1 Nov. 8, 2018

Related U.S. Application Data

(60) Provisional application No. 62/501,630, filed on May 4, 2017.

(51) Int. Cl.
*G06F 21/00* (2013.01)
*G06F 21/62* (2013.01)
(Continued)

(52) U.S. Cl.
CPC ...... *G06F 21/6254* (2013.01); *G06F 9/45558* (2013.01); *G06F 21/31* (2013.01);
(Continued)

(58) Field of Classification Search
None
See application file for complete search history.

(56) References Cited

U.S. PATENT DOCUMENTS 8,533,796 B1 9/2013 Shenoy et al.
2004/0078475 A1 4/2004 Camenisch et al.
(Continued)

FOREIGN PATENT DOCUMENTS

WO 2016179536 A1 11/2016

OTHER PUBLICATIONS

"International Search Report and Written Opinion Issued in PCT Application No. PCT/US18/028759", dated Jun. 19, 2018, 12 Pages.

(Continued)

*Primary Examiner* — Alexander Lagor
(74) *Attorney, Agent, or Firm* — Workman Nydegger

(57) ABSTRACT

A second operating system accessing resources from an external service. A method includes sending an anonymized request, for an anonymized user corresponding to an authorized user, for resources, through a broker. A request for proof indicating that the anonymized user is authorized to obtain the resources is received from the broker. As a result, a request is send to a first operating system for the proof that the anonymized user is authorized to obtain the resources. Proof is received from the first operating system, based on the anonymized user being associated with the authorized user, that the anonymized user is authorized to obtain the resources. The proof is provided to the broker. As a result, the resources are obtained by the second operating system from the service.

20 Claims, 3 Drawing Sheets

(51) Int. Cl.

| | |
|---|---|
| ***G06F 21/31*** | (2013.01) |
| ***G06F 21/74*** | (2013.01) |
| ***G06F 9/455*** | (2018.01) |
| *G06F 9/50* | (2006.01) |

(52) U.S. Cl.

CPC .......... *G06F 21/74* (2013.01); *G06F 9/45533* (2013.01); *G06F 9/5077* (2013.01); *G06F 2009/45587* (2013.01)

(56) References Cited

U.S. PATENT DOCUMENTS

| | | | |
|---|---|---|---|
| 2008/0222700 | A1* | 9/2008 | Goldberg ................ G06F 21/31 726/3 |
| 2014/0053150 | A1 | 2/2014 | Barnett et al. |
| 2014/0109174 | A1 | 4/2014 | Barton et al. |
| 2014/0137125 | A1 | 5/2014 | Hsu |
| 2015/0128105 | A1 | 5/2015 | Sethi et al. |
| 2015/0379287 | A1 | 12/2015 | Mathur et al. |
| 2016/0170651 | A1* | 6/2016 | Liang .................... G06F 9/5022 711/171 |
| 2016/0182315 | A1 | 6/2016 | Salokanto et al. |
| 2016/0366104 | A1 | 12/2016 | Goldberg et al. |
| 2017/0124320 | A1 | 5/2017 | Fojtik et al. |

OTHER PUBLICATIONS

Karle, Akshay, "Operating System Containers vs. Application Containers", https://blogrisingstack.com/operating-system-containers-vs-application-containers/, Published on: May 19, 2015, 11 pages.

Kasireddy, Preethi, "A Beginner-Friendly Introduction to Containers, VMs and Docker", https://medium.freecodecamp.com/a-beginner-friendly-introduction-to-containers-vms-and-docker-79a9e3e119b, Published on: Mar. 4, 2016, 14 pages.

* cited by examiner

CROSS CONTAINER USER MODEL

CROSS-REFERENCE TO RELATED APPLICATIONS

This application claims the benefit of and priority to U.S. Provisional Patent Application Ser. No. 62/501,630 filed on May 4, 2017 and entitled "Cross Container User Model," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Operating systems in computing systems may use hardware resource partitioning. A popular resource partitioning technique is virtual machine-based virtualization, which enables a higher density of server deployments, ultimately enabling scenarios such as cloud computing. Recently, container-based (sometimes referred to as namespace based) virtualization has offered new promises including higher compatibility and increased density. Higher compatibility means lower costs of software development. Higher density means more revenue for the same cost of facilities, labor and hardware.

However, typical container-based solutions share aspects of their operating system with the host computing system. This may include files, configuration, policy, user accounts, user data stores which store user data, and so forth. In some implementations, the user data stores (and the information contained therein) are shared between the host computing system. When a container is created for a user in the host computing system, for example, the container will include a container operating system and a user data store. This will extend the users environment in the container to install and run applications, process data, et cetera. The user will get the benefit of increased application compatibility, and/or increased isolation which protects user data and the host computing system from attack software.

Various challenges may be encountered in such a system. For example, some systems may wish to not allow all of the user data on the host operating system into the container operating system. In some environments, legacy applications make assumptions about data compatibility, to ensure these applications can run as expected, user data must meet these assumptions. In some environments, applications want to access as much information as possible about the user as this is a valuable commodity for purposes of marketing and advertising. However, the user wishes to constrain this information to improve privacy when running specific applications. In some environments, the user wishes to shield themselves from accidental download and execution of malware and attack software.

The subject matter claimed herein is not limited to embodiments that solve any disadvantages or that operate only in environments such as those described above. Rather, this background is only provided to illustrate a few exemplary technology areas where some embodiments described herein may be practiced.

BRIEF SUMMARY

One embodiment illustrated herein includes a method that may be practiced in an environment comprising a host system with a first operating system and a second operating system. The first operating system and the second operating system are separated by a security boundary. The system includes an at least partially anonymized, containerized operating system configured to anonymize an authorized user at the first operating system by hiding information for the authorized user from the second operating system. The method includes acts for the second operating system accessing resources from a service. The method includes sending an anonymized request, for an anonymized user corresponding to the authorized user, for resources, through a broker. A request for proof indicating that the anonymized user is authorized to obtain the resources is received from the broker. As a result, a request is sent to the first operating system for the proof that the anonymized user is authorized to obtain the resources. Proof is received from the first operating system, based on the anonymized user being associated with the authorized user, that the anonymized user is authorized to obtain the resources. The proof is provided to the broker. As a result, the resources are obtained from the service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
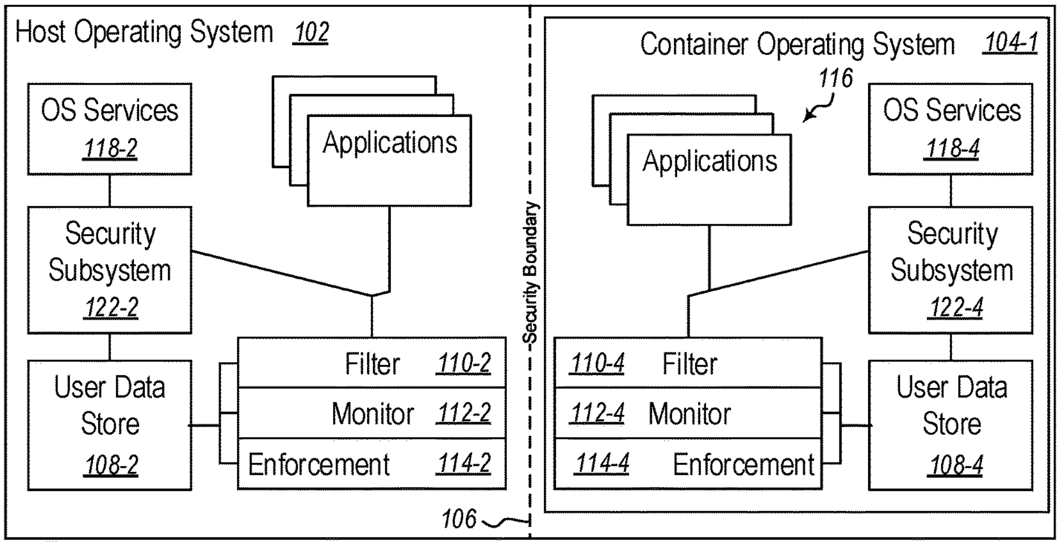
FIG. 1 illustrates a system including a host operating system and a container operating system.

Embodiments described herein can implement a containerized based configuration approach that anonymizes user information, but still allows an anonymized containerized operating system to access resources that require an authorized user to request them. In particular, a container operating system may be created using configuration, files and other elements from another operating system, such as a host operating system where the container operating system re-uses certain user elements from the host operating system that have been anonymized when exposed in the container operating system. However ordinarily, this creates situations where a user using the container operating system may be unable to access certain resources as the user is not properly identified in the container operating system such that the user may not be able to provide the appropriate credentials to be able to access certain resources. Embodiments herein can implement functionality to nonetheless allow such implementations to access those certain resources.

Illustrating now additional details, in a containerized based configuration approach, various hierarchical configuration layers are used to configure entities such as containerized operating systems. Additionally, filters can be applied to configuration layers to accomplish a desired configuration for an entity. In particular, an entity, such as an operating system kernel, can have different portions of different configuration layers exposed to it such that configuration from different configuration layers can be used to configure the entity, but where the entity operates as if it is running in its own pristine environment, even though it is using physical elements from the host operating system. Thus, a given configuration layer could be used as part of a configuration for multiple different entities thus economizing storage, network, and compute resources by multi-purposing them for different container operating systems.

A containerized entity is an isolated runtime that uses operating system resource partitioning. This may be an operating system using hardware-assisted virtualization such as a virtual machine. It may be an operating system using operating-system-level virtualization with complete namespace isolation such as a container. It may be an isolated application running on an operating system using partial namespace isolation (e.g., filesystem and configuration isolation).

As noted above, generally virtual machine-based virtualization provides the same isolation as physical machines, while offering flexibility and density. Container-based virtualization provides an even lighter weight virtualization environment, improved compatibility and lower operational costs by sharing immutable physical portions of an operating system. Today, many server scenarios are adopting containers both in the enterprise and in the cloud. While enterprise and cloud computing reap the benefits, containers also hold promise in client. Beyond providing a functional software development environment, containers will provide the next generation of features around security and isolation. However, as noted above, in the client scenarios, individual credential information may be needed to access certain resources.

Containers achieve their lightweight attributes through sharing aspects of the operating system. This may include sharing files and folders, sharing configuration, sharing devices, and sharing operating system services. In some environments, such as friendly multi-tenant hosting, embodiments can de-duplicate overlapping processes, enabling even more efficient resource utilization. Files, processes and objects are all contributors to process overlap.

There are methods to share processes and information between containers and the host. However, embodiments need to ensure a user in one environment can clearly extend their usage into another environment. For example, a user on the host should be able to seamlessly access files and seamlessly run applications in a container or vice versa. This also may apply across containers and not directly impact the host. Previously, a generic user would be created in a container and the user at the host accesses the container as that generic user. This may include various aspects of overhead such as signing with different credentials, managing user settings and preferences and so forth. A user as illustrated herein is an entity that is external to the host system or an equivalent of an external entity. A user is not an operating system service, although an operating system service can be implemented to act as a proxy for a user. Note that in some embodiments, external machines or external processes external to a host system which hosts a user may be users.

Embodiments illustrated herein may address one or more challenges to extending the user object. For example, FIG. 1 illustrates a system 100. The system 100 includes a host operating system 102 and a container operating system 104-1. Note that typically several container operating systems will be implemented on the system 100. Indeed, efficiency is obtained by several container operating systems sharing elements of the host operating system 102.

As illustrated in FIG. 1, there is a security boundary 106 between the host operating system 106 and the container operating system 104-1. Additionally, although not shown, there can be security boundaries between different container operating systems (referred to herein generically as 104) as well. When user information is stored in a secure, isolated location (i.e., the user data store 108-2) in the host operating system 102 and shared with multiple isolated container operating systems 104, embodiments may include functionality, as illustrated in more detail below, to ensure that the user information is not spoofed or tampered with.

Alternatively or additionally, embodiment may include functionality to Ensure stateful transactions are not repudiated.

Alternatively or additionally, embodiment may include functionality to ensure that information is not disclosed or leaked across the various security boundaries.

Alternatively or additionally, embodiment may include functionality to mitigate attempts to escalate service across the security boundary 106 or denial of service across the security boundary 106.

To enable a more flexible approach to cross-container user access, some embodiments determine a root operating system (shown in some of the examples below as a 'first operating system') (e.g., host operating system 102), where a given user's information is stored and tracked. From this root, the user object is extended to other operating systems (shown in some of the examples below as a 'second operating system'), e.g., container operating systems, such as the container operating system 104-1. Note, in some embodiments, a root operating system may be a container operating system, and the other operating system may be a different container operating system. To maintain the security boundary 106 between operating systems, the user object is abstracted; and where applicable, the user object may be anonymized.

The following now illustrates details with respect to an architecture that may be used to implement some embodiments of the invention.

There are many operating system processes, services and objects that may need to share information between the container operating system 104-1 and the host operating system 102. Benefits to better sharing include: more efficient operation, higher density, or using a trusted broker to achieve better security and isolation. Information about users such as a user object may also be shared. This extends the user model across operating system instances, offering convenience in access, all while maintaining isolation. In some embodiments, such as running a secure browser application, this may be an important method to providing persistence of user data such as favorites, home pages and other personalized settings. In other embodiments similar user data may be persisted, for example if the user was running a word processing application, the documents he or she was writing could be locally saved. In some embodiments the user will want to remain anonymous. Here, the root operating system may create a map between the local user and the user data in the remote operating system (such as a container). This map may include certain specific data such as an access level to ensure seamless access to files and applications in the remote operating system.

Embodiments may include functionality to achieve the benefits of user access while maintaining isolation. In some scenarios, container operating systems 104 are used to isolate one or more applications from a pristine, secure host operating system 102. (Note that while the examples herein are for the most part generally directed to isolating container operating systems from host operating systems, it should be appreciated that embodiments of the invention may alternatively or additionally isolate different container operating systems from each other.) These applications, for example, could be used to access resources, such as Internet resources (such as web sites and files) from locations in which they may, accidently or intentionally, download malware or attack software as well. In this environment, the container operating system 104-1 is assumed to be insecure, and the host operating system 102 is behaving as the trusted broker and managing the user data. To achieve this, some embodiments map the user objects between the host operating system 102 and the container operating system 104-1 (or container operating system to container operating system in the container operating systems 104) in a way that is secure and unexploitable across the security boundary 106 (or container operating system to container operating system security boundaries). Embodiments may alternatively or additionally filter user data across the security boundary 106.

The architecture shown in FIG. 1 illustrates one example embodiment and how it impacts the relationship between the host operating system 102 and the container operating system 104-1. However, embodiments of the invention may also apply between any two entities that share user access, whether they be a host operating system, a container operating system, a network node (such as a web proxy or firewall), etc.

FIG. 1 is an architecture diagram with components as explained below. Note that the operating system instances are typically connected to share data. This may be a network connection, a named pipe, an RPC channel or something similar. Note that the filter components (generally referred to as 110), monitor component (generally referred to as 112), and enforcement component (generally referred to as 114) are optional on a remote operating system (such as the container operating system 104-1). Additionally, some embodiments may not have these components.

The host operating system 102 is an operating system that has the capabilities to host additional operating system instances such as container operating systems 104. The boundary between the host operating system 102 and one or more container operating systems 104 is a security boundary 106.

The container operating system 104-1 (note that a single container operating system 104-1 is illustrated, but many embodiments will implement multiple container operating systems, referred to generally as 104) is an entity which is an operating system that runs one or more applications 116 that require isolation from the host operating system 102. The container operating system 104-1 may also or alternatively be configured to meet additional unique requirements to achieve compatibility including running a different operating system version, having a different configuration and so forth.

OS services 118-2 and 118-4 (generally referred to as 118) are components that run the operating system services to support applications. Some operating systems refer to system services as "daemons".

The user data stores 108-2 and 108-4 (generally referred to as 108) are components that store user data such as username and the metadata that is associated with a user. This metadata contains access levels, settings, files and other content. Filter configuration is also stored here. The monitoring and enforcement components (generally referred to as 112 and 114) may store logging here to tightly associate with the user. This could include transaction information, timestamps, and how user information is mapped into a remote OS instance. Some operating systems may store credentials here; other operating systems may have a credential vault that they access (not illustrated). Note that the user data store may store user data that is not specifically intended to be used on the root OS; as the container operating system 104-1 may be a different operating system with a different schema than the host operating system 102.

The security subsystems 122-2 and 122-4 (generally referred to as 122) are components that track the identity of the remote endpoints (e.g. container operating system 104-1, host operating system 102, etc.). The security subsystem 122 decides what user data to share; and controls the configuration of the filter component 110, monitoring component 112, and enforcement component 114. The security subsystem 122 also does other general tasks such as managing the local security policy and tracking user accounts.

The filter components 110-2 and 110-4 (generally referred to as 110) are components that are used to map a user in a root operating system (such as the host operating system 102) into another operating system, such as container operating system 104-1. Note that in other embodiments, a root operating system may be a container operating system and the other operating system may be another container operating system. Based on configuration, a filter component will determine how much data to share.

The monitor components 112-2 and 112-4 (generally referred to as 112) are components that performs monitoring on what information is sent across the security boundary 106. The monitor component 112 is configured by the corresponding security subsystems 122 and may be informed by the user data stores 108. For additional visibility, the monitor component 112 may also have a plug-in model in which the plug-ins provide their data schemas and state machines. The monitor component 112 may send alerts to the operating system 102 or 104 as appropriate if unexpected information or unexpected communication attempts are observed. The monitor component 112 may also record what it monitors via telemetry or write it to a log file for future analysis.

The enforcement components 114-2 and 114-4 are components that perform enforcement across the security boundary 106 (or other security boundary). In some embodiments, the enforcement component (referred to generally as 114)

has a set number of resource controls or quality of service metrics for each user that is being monitored. In some embodiments, the enforcement component 114 may receive alerts from the monitor component 112 that unexpected information is being transferred. The enforcement component 112 may then determine that the communication across the security boundary 106 (or other security boundary) is in violation and stop the communication.

Figure 2:
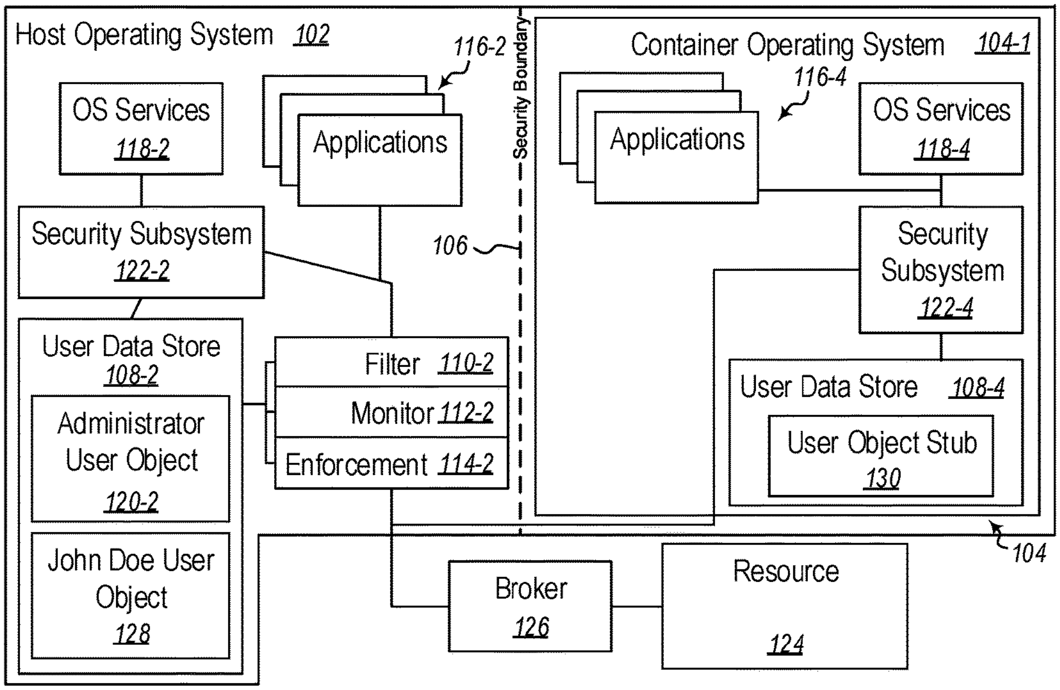
FIG. 2 illustrates another example of the host operating system and the container operating system.

The following now illustrates an operational model, with reference to FIG. 2. Here, a concrete example of how a user on the host operating system 102 accesses an application and files on the container operating system 104-1 is illustrated. In some embodiments, the user and the application (e.g., one of the applications in the applications 116-4) have a need to access a resource 124 such as a website (e.g., www.bing.com). In this example, DNS is demonstrated as a distributed service.

In this scenario, the security subsystem 122-2 in the host operating system has access to the security subsystem 122-4 in the container operating system 104-1. A John Doe User Object 128 is passed through the filter, monitor and enforcement components 110-2, 112-2, and 114-2 by the security subsystem 122-2 in the host operating system 102 and sent to the container operating system 104-1 to populate the user object stub 130 that is in the user data store 108-4 of the container operating system 104-1. In some embodiments, John Doe's username and identity are preserved in the container operating system 104-1. However, in other embodiments, John Doe's user name and identity are anonymized. For anonymization, the filter component 110-2 on the host operating system 102 may delete and/or overwrite some of the information when passing it to the user object stub 130. Thus, for example, some information may be completely removed, such that some of the user elements are blank in the user data store 108-4. In other embodiments, a pseudonym or other obfuscation may be used in place of user information in the host operating system 102. For example, instead of a username "John_Doe" being propagated to the user data store 108-4 at the container operating system 104-1, a username "Brian_Roe" may be propagated to the user data store 108-4. Note that the user data store 108-2 at the host operating system 102 can track pseudonyms correlated with actual user data. Some embodiments may implement this tracking functionality to the filter and security subsystem.

When the user object stub 130 is populated, John Doe is able to use applications 116-4 and access files (not shown) on the container operating system as he expects. For example, if John Doe was using a web browser application in the container operating system 104-1, John Doe may be able to access the same favorites that he gets on the host operating system 102.

In a related scenario, John Doe wants to access a resource 124, such as www.bing.com. The web browser application in the container operating system 104-1 asks the broker service for the broker 126 for this website. In this example, the broker 126 is a web proxy. Then it does a DNS a name lookup for the broker 126, obtaining its IP addresses and it opens a socket connection to the broker 126. Now the web browser in the container operating system 104-1 sends an HTTP get request to the IP address of the broker 126 asking to retrieve the request from www.bing.com. This is received by a broker 126. Note that in the illustrated example, the broker 126 may be an enterprise web proxy tasked with ensuring that enterprise machines do not access unauthorized external resources or that unauthorized users do not access (either by whitelist or blacklist) certain external resources The broker 126 sends a challenge request back to the web browser in the container operating system 104-1 because, in this example, entities on the network authenticate to the broker 126 to have access to the Internet. Upon receiving this broker challenge, the web browser in the container operating system 104-1 queries the security subsystem 122-4 in the container operating system 104-1. The security subsystem 122-4 in the container operating system 104-1 queries the user data store 108-4 to access the user object stub 130. In some embodiments, this information resides in the user object stub 130 and the challenge is just answered and access to the resource (i.e., the resource 124) is granted by the broker 126

In other embodiments, the information is only in the user data store 108-2 on the host operating system. In this case, the security subsystem 122-4 in the container operating system 104-1 queries the security subsystem 122-2 in the host operating system 102 for this information. The information may be provided to the user data store 108-4 in the container operating system (e.g. via being mapped in via the filter 110-2). Alternatively, the security subsystem 122-2 on the host operating system 102 generates a challenge response. This information is then passed to the container operating system 104 and associated with the user object stub 130. The web browser in the container operating system 104-1 then gets this information from the security subsystem 122-4 in the container operating system 104-1 and sends it to the broker 126 as a response to its challenge. The broker 126 then sends the web browser in the container operating system 104-1 a response that authentication is completed. The web browser in the container operating system 104-1 then sends the HTTP get requests to the resource 124 and is able to download the web information.

In some implementations, the security subsystem 122-2 negotiates version and data schema for user objects. This may be done by manually looking at the container operating system version or a manifest file to identify a potential list of possible data schemas, or it may be interactive, in which security subsystem 122-2 directly contacts security subsystem 122-4 to share a list of possible data schemas. The best compatibility may be selected using a priority list that is shared as part of the negotiation, or take an approach of a pre-determined highest common denominator of the compatible version negotiation. There may be other approaches such as doing a dynamic analysis of the available data schemas.

In some implementations, the privilege level may differ between the host operating system 102 and the container operating system 104-1, even though the user is mapped. For example, John Doe may be a standard user on the host operating system, but a member of the Administrators group when in the container operating system 104-1.

It is important to note that in some embodiments the broker and the resource may be on the local host. For example, in some embodiments, an application running in the container operating system 104-1 may request a resource on host operating system 102. This resource may be a document, a configuration file, or temporary access to a device. In these embodiments, authentication occurs locally and access will be granted in a similar mechanism as outlined in FIG. 2 and described above, but where the broker 126 is physically running in the host operating system 102 and where the resource 124 is at the host operating system. In this way, the application can run in the anonymized context of the container operating system 104-1, but can access resources in the host operating system 102, including creating, reading, and/or modifying such resources. When the container operating system 104-1 is later deleted, effects of the application running in the container operating system are nonetheless persisted in the resource.

Figure 4:
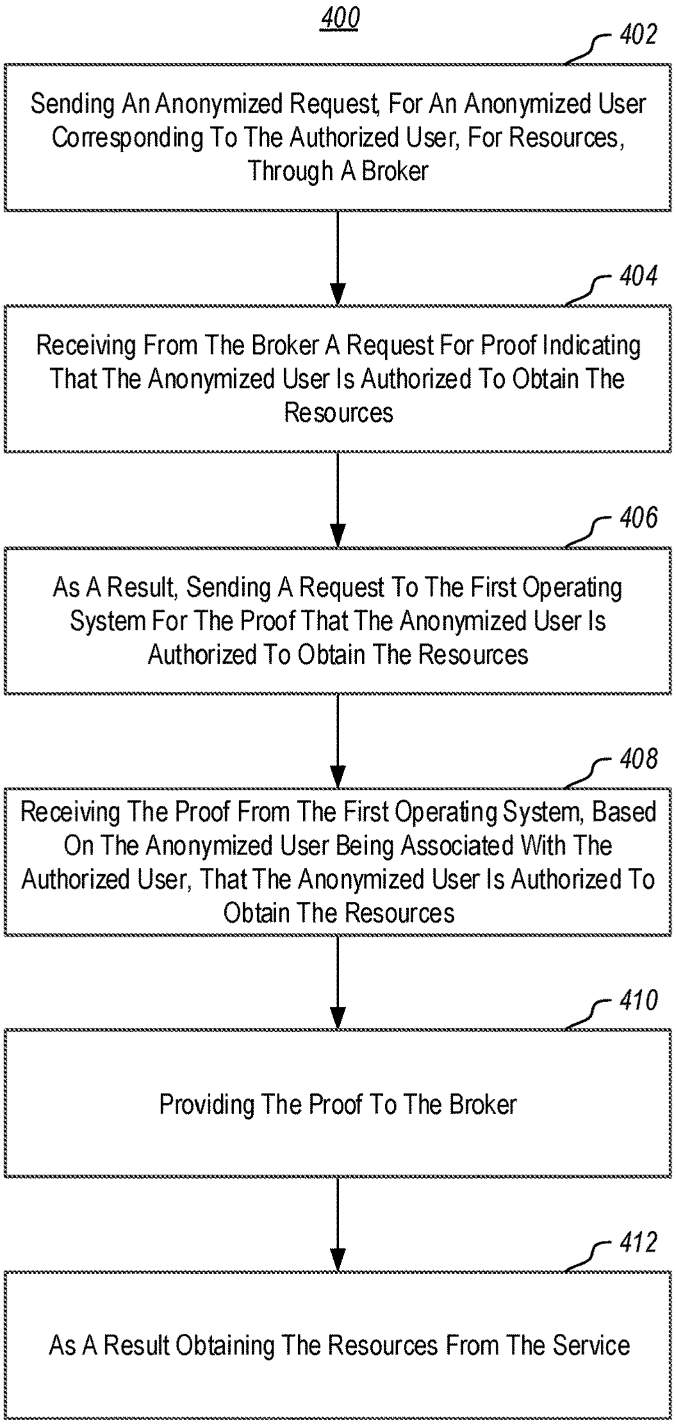
FIG. 4 illustrates a method of a container operating system accessing resources from a service.

The following now illustrates various methods and method acts that may be performed in some embodiments. Reference is made to FIG. 4, which illustrates a method 400.

The method 400 may be practiced in an environment comprising a host system with a first operating system and a second operating system. The first operating system and the second operating system may be separated from each other by a security boundary. The second operating system comprises an at least partially anonymized, containerized operating system configured to anonymize an authorized user at the first operating system by hiding information of the authorized user (e.g., identity and/or other information) from the second operating system. A method includes acts for the second operating system accessing resources from an external service. For example, as illustrated in FIG. 2, a method may include entities at the containerized operating system 104-1 accessing resources (such as web pages, files, etc., at the resource 124).

The method includes sending an anonymized request, for an anonymized user corresponding to the authorized user, for resources through a broker (act 402). For example, a request may be sent to the broker 126 from an application, such as one of the applications 116-4 for resources for resources at the resource 124. Note that the request, in some embodiments, may be sent from the application through an intermediate service (not shown) at the container operating system 104-1. The intermediate service could be any intermediate system that is requesting authorization for an application or service running in the container operating system 104-1. If that user information resides on the host operating system 102, the host operating system 102 has the ability to proxy for the container operating system, enabling the application or service (on behalf of the user in the host operating system 102) to access the resource 124. Alternatively or additionally, the intermediate service could be an authentication proxy to the proxy authority in the host operating system 102. Alternatively or additionally, such requests may be sent directly from an application to the broker 126.

The method 400 further includes receiving from the broker a request for proof indicating that the anonymized user is authorized to obtain the resources (act 404). For example, the broker 126 may ask components at the container operating system 104-1 to provide proof that they are authorized to access the resources at the resource 124. As noted, the components at the container operating system 104-1 may not have this proof readily available due to the authorized user being anonymized to in the container operating system 104-1.

Thus, as a result, the second operating system sends a request to the first operating system for the proof that the anonymized user is authorized to obtain the resources (act 406). This may be accomplished in a number of different ways, and embodiments may include other steps to facilitate this action. For example, an application in the container operating-system 104-1 may contact the OS Services 118-4 and/or the security subsystem 122-4 in the container operating system 104-1 to initiate the request to the host operating-system 102 for the proof that the anonymous user is authorized to obtain the resources. In some embodiments, the security subsystem 122-4 in the container operating-system 104-1 will query the use of data store 108-4 in the container operating-system 104-1 to attempt to obtain the proof. The container operating-system requesting proof from the host operating-system may include the user data store 108-4 in the container operating-system 104-1 sending a query to one or more of the filter component 110-2, the monitor component 112-2, or the enforcement component 114-2. In an alternative embodiment, the security subsystem 122-4 in the container operating-system 104-1 may send a request for the proof to one or more of the filter component 110-2, the monitor component 112-2, or the enforcement component 114-2.

The method further includes receiving the proof from the first operating system, based on the anonymized user being associated with the authorized user, that the anonymized user is authorized to obtain the resources (act 408). This may include, or be enabled, by various actions taken by the first operating-system 102. For example, one or more of the filter component 110-2, the monitor component 112-2, or the enforcement component 114-2 may request information from the security subsystem 122-2 in the host operating-system 102 to attempt to obtain the proof to be returned to the container operating-system 104-1. Alternatively or additionally, the security subsystem 122-2 and the host operating-system 102 may attempt to obtain information from the user data store 108-2 to attempt to identify if the anonymized user and/or authorized user are authorized to obtain resources from the resource 124. In some embodiments, the security subsystem 122-2 will return the appropriate information to the filter component 110-2, the monitor component 112-2, or the enforcement component 114-2, which returns information to the security subsystem 122-4 and the container operating-system 104-1, where it can be used as appropriate. The container operating system 104-1 is not necessarily in charge of validating the proof, and in some embodiments may not be able to interpret the proof.

The method further includes providing the proof to the broker (act 410). For example, in some embodiments, the application can provide the received proof to the broker 126 directly. Alternatively or additionally, a secondary service at the container operating-system 104-1 can provide the proof to the broker 126. Alternatively or additionally, the security subsystem 122-4 can provide the proof to the broker 126.

The method further includes, as a result, obtaining the resources from the service (412). For example, the broker 126 may forward the requests for resources to the resource 124 to allow the resources to be obtained from the resource 124.

Note that the method may be practiced where the proof that is returned is not necessarily a password are username that enables the broker 126 to forward the request to the resource 124, but and rather may simply be proof that the anonymized user at the container operating-system 104-1 matches an authorized user at the first operating-system 102 that is authorized to access the resource 124. Thus for example, the proof may be some type of token or other indicator that can be provided from the container operating-system 104-1 to the broker 126.

In some embodiments, obtaining the resources from the service is performed as a result of the first operating system providing an indication of the proof to the broker through a channel external to the second operating system. For example, in some embodiments the host operating-system 102 may directly provide the proof to the broker 126 allowing the resources to be obtained by the container operating-system 104-1, and in particular a requesting application at the container operating-system 104-1.

The method may be practiced where obtaining the resources from the service is performed as a result of the first operating system providing an indication to the broker through a channel external to the second operating system that a retry of the request for the resources by the container operating system should be granted, and wherein the proof provided from the second operating system to the broker comprises a retry of the request for resources.

Figure 3:
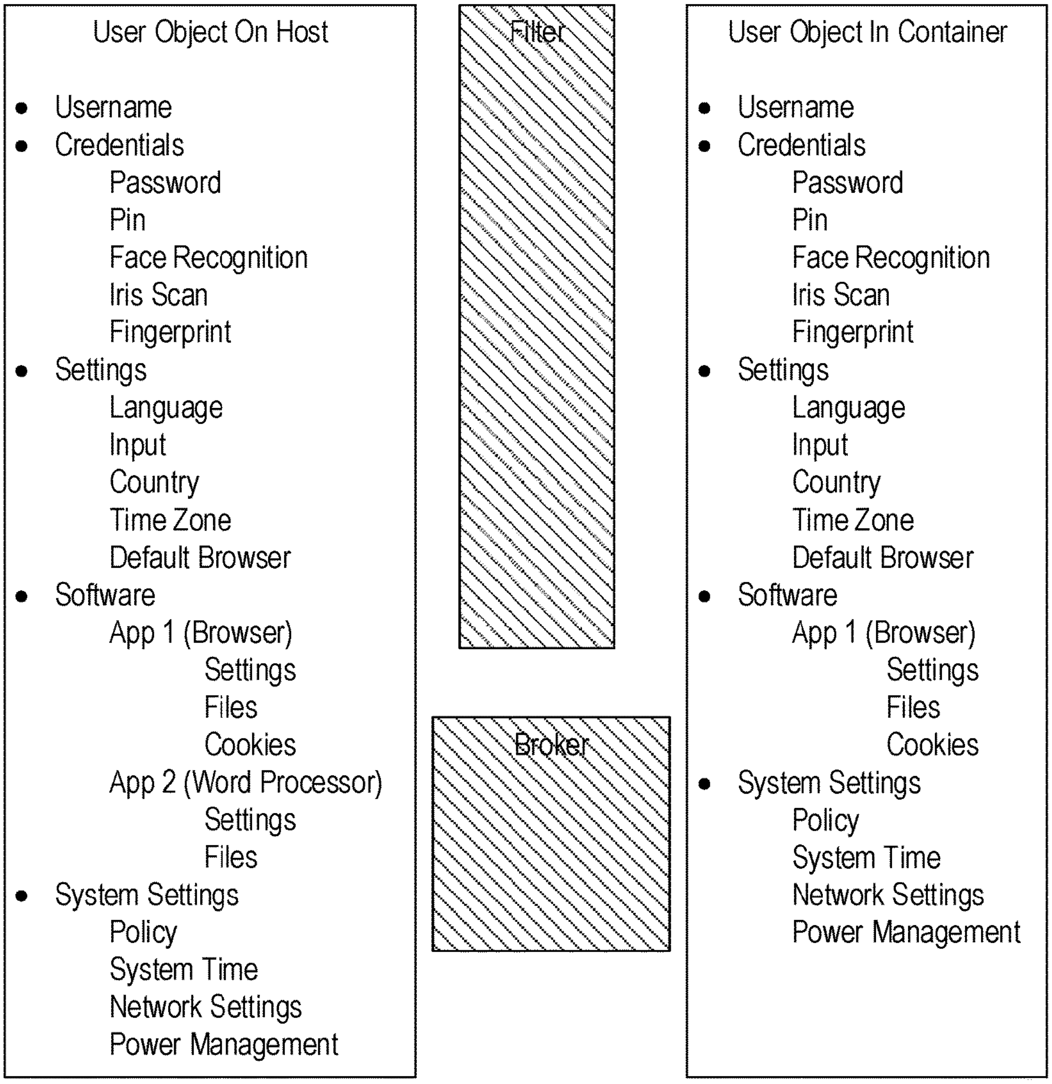
FIG. 3 illustrates a system where a filter and/or a broker may be used to anonymize certain elements from user objects on a host operating system on a container operating system.

Embodiments may include functionality for creating the second operating system from the first operating system by anonymizing some elements of the first operating system in the second operating system, but maintaining some personalized elements of the first operating system (such as location, input language, country, time zone, default browser, etc.) in the second operating system. FIG. 3 illustrates an example where a filter and/or broker may be used to anonymize certain elements from user objects on the first operating system on the second operating system.

Another embodiment may include acts to apply a user object in a root operating system (e.g., the host operating system 102) to one or more other operating system instances (e.g., the container operating system 104-1). Such embodiments for a given user object, may track other operating system instances to which a user has access. For each other operating system, embodiments track user identities and authorization levels (including applications, services and files).

For a given user object, embodiments perform actions to ensure an appropriate level (as defined by some user settings, global administrator defined settings, default settings, or otherwise) of abstraction is applied to transition a security boundary between the root operating system and another operating system instance. In some embodiments, this may be implemented in a service scenario, enabling an administrator to access many container instances to change configuration, policy and so forth.

For metadata associated with each user, embodiments perform a mapping to ensure this information transitions the security boundary.

Some embodiments may include actions to anonymize the user. For example, such embodiments may, for a given user object, associate the user object with a stub in another operating system instance. These embodiments may create a unique, anonymized identifier to represent the user object to extend it beyond the root operating system. These embodiments may further apply a metadata filter to only provide an appropriate set of user metadata that is associated with the user stub. Such embodiments may further inject files associated with the user in another operating system instance. For example, in some implementations, one or more applications 116-4 require user location information, however the filter 110-2 blocks user location information (such as time zone, GPS coordinates, etc.). In this example, the metadata filter injects the appropriate user location information, satisfying the requirements of applications 116-4.

Embodiments may additionally or alternatively negotiate version information between the root operating system and another operating system instances. Thus, for example, the root operating system and the another operating system may be different versions of the same operating system. This call allow different functionality to be implemented between the different operating systems.

Embodiments may additionally or alternatively share data schemas between the root operating system and other operating system instances.

Embodiments may additionally or alternatively monitor communications between the root operating system and other operating system instances.

Embodiments may additionally or alternatively enforce communications between the root operating system and other operating system instances.

Further, the methods illustrated herein may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Alternatively or in addition, the functionality described herein may also be implemented all or in part through use of a distributed system, such as a "cloud". The cloud abstracts underlying functionality of hardware (e.g., servers, network hardware, storage hardware, et cetera) and software resources, which may include applications, data and/or services (e.g. an authentication service, a directory service, a naming service, et cetera) that can be utilized while computer processing is executed on servers that are discrete from host operating system. Host operating system may connect to this cloud via a local area network (LAN), a metropolitan area network (MAN) and/or a wide area network (WAN). In some embodiments a host operating system may be part of a cloud, and customers may use container operating system. In other embodiments, both a host operating system and container operating system may be part of a "cloud platform" that provides capabilities and services to customers that rent resources such as virtual machine and/or containers. It should be noted that the cloud and the cloud platform can be arranged in a myriad of configurations. For example, the cloud can be implemented as a single cloud, as multiple instances of a cloud all behaving as a single cloud, or with one or more instances of a cloud platform implemented behind the cloud and behaving as if the one or more instances of the cloud platform were implemented in the cloud.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that operates a first operating system and a second operating system, where the first operating system and the second operating system are separated by a security boundary, the second operating system comprising an at least partially anonymized, containerized operating system configured to anonymize an authorized user at the first operating system by hiding information for the authorized user from the second operating system, the computer system comprising:

one or more hardware processors; and one or more computer-readable media having stored thereon instructions that are executable by the one or more hardware processors to configure the computer system to cause the second operating system to access resources from the first operating system, including instructions that are executable to configure the computer system to perform at least the following:

anonymize identity information related to the authorized user at the first operating system to generate an anonymized user at the second operating system;

send an anonymized request from the second operating system, for the anonymized user corresponding to the authorized user, for resources that the authorized user is authorized to access;

determine the anonymized user at the second operating system is authorized to access the resources;

authorize the anonymized user at the second operating system to access the requested resource that the authorized user is authorized to access at the first operating system; and as a result obtain the requested resources for the anonymized user at the second operating system.

2. The system of claim 1, wherein obtaining the resources from the service is performed as a result of the first operating system providing an indication of the proof to the broker through a channel external to the second operating system.

3. The system of claim 1, wherein obtaining the resources from the service is performed as a result of the first operating system providing an indication to the broker through a channel external to the second operating system that a retry of the request for the resources by the second operating system should be granted, and wherein the proof provided from the second operating system to the broker comprises a retry of the request for resources.

4. The system of claim 1, wherein the one or more computer-readable media further have stored thereon instructions that are executable by the one or more processors to configure the computer system to perform at least the following:

create the second operating system from the first operating system by anonymizing some elements of the first operating system in the second operating system, but maintaining some personalized elements of the first operating system in the second operating system.

5. The system of claim 4, wherein anonymizing some elements of the first operating system in the second operating system comprises filtering out location information.

6. The system of claim 4, wherein the personalized elements of the first operating system comprises at least one of location, input language, country, time zone, or default browser.

7. The system of claim 1, wherein the one or more computer-readable media further have stored thereon instructions that are executable by the one or more processors to configure the computer system to create the second operating system from the first operating system by the second operating system and the first operating system negotiating version and data schema for user objects.

8. In an environment comprising a host system with a first operating system and a second operating system, where the first operating system and the second operating system are separated by a security boundary, comprising an at least partially anonymized, containerized operating system configured to anonymize an authorized user at the first operating system by hiding information for the authorized user from the second operating system, a method of the second operating system accessing resources from an external service, the method comprising:

anonymizing identity information related to the authorized user at the first operating system to generate an anonymized user at the second operating system;

sending an anonymized request from the second operating system, for the anonymized user corresponding to the authorized user, for resources that the authorized user is authorized to access;

determining the anonymized user at the second operating system is authorized to access the resources;

authorizing the anonymized user at the second operating system to access the requested resource that the authorized user is authorized to access at the first operating system; and as a result obtaining the requested resources for the anonymized user at the second operating system.

9. The method of claim 7, wherein obtaining the resources from the service is performed as a result of the first operating system providing an indication of the proof to the broker through a channel external to the second operating system.

10. The method of claim 7, wherein obtaining the resources from the service is performed as a result of the first operating system providing an indication to the broker through a channel external to the second operating system that a retry of the request for the resources by the second operating system should be granted, and wherein the proof provided from the second operating system to the broker comprises a retry of the request for resources.

11. The method of claim 7 further comprising:

creating the second operating system from the first operating system by anonymizing some elements of the first operating system in the second operating system, but maintaining some personalized elements of the first operating system in the second operating system.

12. The method of claim 11, wherein anonymizing some elements of the first operating system in the second operating system comprises filtering out user information, the method further comprising injecting files into the second operating system having location information.

13. The method of claim 11, wherein the personalized elements of the first operating system comprises at least one of location, input language, country, time zone, or default browser.

14. The method of claim 7 further comprising creating the second operating system from the first operating system by the second operating system and the first operating system negotiating version and data schema for user objects.

15. A host system comprising:

one or more hardware processors; and one or more computer readable media having stored thereon instructions that are executable by one or more hardware processors to configure the host system to operate:

a first operating system; and a second operating system, wherein the containerized operating system comprises an at least partially anonymized, containerized operating system configured to anonymize an authorized user at the first operating system by hiding information for the authorized user from the second operating system;

wherein the first operating system and the second operating are separated by a security boundary;

wherein the second operating system is configured to:

anonymize identity information related to the authorized user at the first operating system to generate an anonymized user at the second operating system;

send an anonymized request from the second operating system, the an anonymized user corresponding to the authorized user, for resources that the authorized user is authorized to access;

determine the anonymized user at the second operating system is authorized to access the resources;

authorize the anonymized user at the second operating system to access the requested resource that the authorized user is authorized to access at the first operating system; and as a result obtain the requested resources for the anonymized user at the second operating system.

16. The system of claim 15, wherein obtaining the resources from the service is performed as a result of the first operating system providing an indication of the proof to the broker through a channel external to the second operating system.

17. The system of claim 15, wherein obtaining the resources from the service is performed as a result of the first operating system providing an indication to the broker through a channel external to the second operating system that a retry of the request for the resources by the second operating system should be granted, and wherein the proof provided from the second operating system to the broker comprises a retry of the request for resources.

18. The system of claim 15, wherein some elements of the first operating system are anonymized in the second operating system by having location information filtered out from the first operating system.

19. The system of claim 15, wherein the first operating system comprises personalized elements that are anonymized from the second operating system, including at least one of location, input language, country, time zone, or default browser.

20. The system of claim 15, wherein the second operating system is created from the first operating system by the second operating system and the first operating system negotiating version and data schema for user objects.

* * * * *